(12) United States Patent
Yasuda et al.

(10) Patent No.: US 11,828,385 B2
(45) Date of Patent: Nov. 28, 2023

(54) FLOW CONTROL VALVE SEAL AND FLOW CONTROL VALVE DEVICE

(71) Applicant: NTN CORPORATION, Osaka (JP)

(72) Inventors: Ken Yasuda, Mie (JP); Takuya Ishii, Mie (JP)

(73) Assignee: NTN CORPORATION, Osaka (JP)

(*) Notice: Subject to any disclaimer, the term of this patent is extended or adjusted under 35 U.S.C. 154(b) by 69 days.

(21) Appl. No.: 17/417,363

(22) PCT Filed: Dec. 24, 2019

(86) PCT No.: PCT/JP2019/050591
§ 371 (c)(1),
(2) Date: Jun. 22, 2021

(87) PCT Pub. No.: WO2020/138073
PCT Pub. Date: Jul. 2, 2020

(65) Prior Publication Data
US 2022/0074503 A1   Mar. 10, 2022

(30) Foreign Application Priority Data

Dec. 25, 2018 (JP) ................. 2018-241736
Dec. 23, 2019 (JP) ................. 2019-231496

(51) Int. Cl.
*F16K 5/04* (2006.01)
*F16J 15/20* (2006.01)
(Continued)

(52) U.S. Cl.
CPC ............. *F16K 5/0464* (2013.01); *F16J 15/20* (2013.01); *F16J 15/3204* (2013.01);
(Continued)

(58) Field of Classification Search
CPC .... F16J 15/00; F16J 15/16; F16J 15/50; F16J 15/52; F16J 15/18; F16J 15/20;
(Continued)

(56) References Cited

U.S. PATENT DOCUMENTS

| 3,030,068 | A | | 4/1962 | Priese |
| 3,041,036 | A | * | 6/1962 | McFarland, Jr. ..... F16K 5/0471 |
| | | | | 251/315.11 |

(Continued)

FOREIGN PATENT DOCUMENTS

| BR | 9711297 A | 8/1999 |
| CA | 2266549 C | 4/1998 |

(Continued)

OTHER PUBLICATIONS

Machine Translation of JP2016-188693A dated Nov. 4, 2016.
(Continued)

*Primary Examiner* — Nathan Cumar
(74) *Attorney, Agent, or Firm* — Hedman & Costigan, P.C.; James V. Costigan; Kathleen A. Costigan (57) ABSTRACT

To provide a flow control valve seal that is manufactured at a low cost, that makes wear damage of a rotor with which the flow control valve seal slidably contacts less, and that is superior in its low leak performance, low friction performance, and low wear performance. A seal (6) is installed in a flow control valve device (1) including a housing (2) having an introduction part (5) that receives a cooling water from an internal combustion engine, and a resin rotor (4) disposed in the housing (2) and having a spherical outer peripheral surface (4a), the rotor (4) being rotated relative to the housing (2). The seal (6) is disposed between the introduction part (5) and the rotor (4) in the housing (2) and slidably contacts with the outer peripheral surface (4a) of the rotor (4). The seal (6) is an injection molded body of a resin (Continued)

composition having injection-moldable fluororesin as a base resin. The fluororesin is at least one resin selected from among a tetrafluoroethylene-perfluoro alkylvinyl ether copolymer resin, a tetrafluoroethylene-hexafluoropropylene copolymer resin, and a tetrafluoroethylene-ethylene copolymer resin.

5 Claims, 4 Drawing Sheets (51) Int. Cl.
  *F16J 15/3204*    (2016.01)
  *F16K 5/06*    (2006.01)
  *F16K 25/00*    (2006.01)
  *F01P 7/14*    (2006.01)

(52) U.S. Cl.
  CPC .......... *F16K 5/0471* (2013.01); *F16K 5/0668* (2013.01); *F16K 5/0689* (2013.01); *F16K 25/005* (2013.01); *F01P 2007/146* (2013.01)

(58) Field of Classification Search
  CPC .......... F16J 15/22; F16J 15/32; F16J 15/3204; F16J 15/3208; F16J 15/3216; F16J 15/322; F16K 5/00; F16K 5/04; F16K 5/0457; F16K 5/0464; F16K 5/0471; F16K 5/0663; F16K 5/0668; F16K 5/0684; F16K 5/0689; F16K 25/00; F01P 2007/146
  USPC ....................................................... 277/535
  See application file for complete search history.

(56) References Cited

U.S. PATENT DOCUMENTS

| | | | | |
|---|---|---|---|---|
| 5,823,540 | A * | 10/1998 | Grabau | ............... C09K 3/1009 |
| | | | | 277/536 |
| 2004/0251635 | A1 * | 12/2004 | Ishida | ..................... F16J 15/18 |
| | | | | 277/510 |
| 2017/0191574 | A1 | 7/2017 | Takamatsu et al. | |

FOREIGN PATENT DOCUMENTS

| | | |
|---|---|---|
| CN | 1231683 A | 10/1999 |
| CN | 106255849 A | 12/2016 |
| CN | 110099973 A | 8/2019 |
| DE | 69717832 T2 | 9/2003 |
| DE | 102016116550 A1 | 3/2018 |
| EP | 0928315 B1 | 12/2002 |
| EP | 3171059 A1 | 5/2017 |
| EP | 3290758 A1 | 3/2018 |
| EP | 3339386 A1 | 6/2018 |
| JP | 38-6934 B1 | 5/1963 |
| JP | 46-009391 B1 | 3/1971 |
| JP | 54-044422 U | 3/1979 |
| JP | 58-167367 U | 11/1983 |
| JP | 2001-501235 A | 1/2001 |
| JP | 2005-233395 A | 9/2005 |
| JP | 2012193778 A * | 10/2012 |
| JP | 2015218775 A * | 12/2015 |
| JP | 2016-188693 A | 11/2016 |
| JP | 2018-179122 A | 11/2018 |
| JP | 2020-502345 A | 1/2020 |
| KR | 201900970944 A | 8/2019 |
| WO | 98/13422 A1 | 4/1998 |
| WO | 2016/009749 A1 | 1/2016 |
| WO | 2018/115490 A1 | 6/2018 |
| WO | 2018/190234 A1 | 10/2018 |

OTHER PUBLICATIONS

Machine Translation of JP2018-179122A dated Nov. 15, 2018.
Machine Translation of related abstract of DE69717832 dated Sep. 25, 2003.
Machine Translation of JP2001-501235A dated Jan. 30, 2001.
Machine Translation of JP2005-233395A dated Sep. 2, 2005.
Machine Translation of Abstract of EP3290758 dated Mar. 7, 2018.
Machine Translation of JP58-167367U dated Nov. 8, 1983.
Machine Translation of JP46-009391A dated Mar. 9, 1971.
Machine Translation of JP54-044422U dated Mar. 27, 1979.
Machine Translation of JP2020-502345A dated Jan. 23, 2020.
Machine Translation of Abstract of DE102016116550A1 dated Mar. 8, 2018.
Cited U.S. Pat. No. 3,030,068 is equivalent to JP 38-6934.
Machine Translation of description of corresponding document for AU4054897 dated Apr. 17, 1998.
Machine Translation of abstract of corresponding document for AU4054897 dated Apr. 17, 1998.
Machine Translation of Abstract of BR9711297A dated Aug. 17, 1999.
Machine Translation of Abstract of CN1231683A dated Oct. 13, 1999.
Machine Translation of CN106255849A dated Dec. 21, 2016.
Machine Translation of Abstract of CN110099973A dated Aug. 6, 2019.
Machine Translation of Abstract of KR201900970944A dated Aug. 20, 2019.

* cited by examiner

FLOW CONTROL VALVE SEAL AND FLOW CONTROL VALVE DEVICE

TECHNICAL FIELD

The present invention relates to a flow control valve seal installed in a flow control valve device that adjusts a flow rate and a flow passage of cooling water from an internal combustion engine in order to achieve low fuel consumption by enhancing heat efficiency of a vehicle, and a flow control valve device having the flow control valve seal.

BACKGROUND ART

Conventionally, a circulation flow passage for cooling an engine by circulating cooling water has been disposed in a vehicle. The circulation flow passage is provided with, for example, a plurality of flow passages such as a flow passage that circulates the cooling water in a radiator, and a flow passage that circulates the cooling water in a heat core of an air conditioner. A flow control valve device that controls a flow rate of the cooling water is disposed in the circulation flow passage, and the flow rate or the like of the cooling water in each flow passage is adjusted by the flow control valve device.

As the flow control valve device, for example, Patent Document 1 discloses a flow control valve device provided with: a housing that includes an introduction port that receives the cooling water from an internal combustion engine and a discharge part that protrudes to discharge the cooling water; a rotor that includes a wall part having a spherical outer surface, and that rotates around a rotational axis that extends perpendicularly relative to the introduction port; and a ring-like seal that is disposed in the discharge part and slidably contacts with the outer surface of the rotor. Patent Document 1 discloses that a thermoplastic resin such as a polytetrafluoroethylene (PTFE) resin can be used as a material of the ring-like seal.

PRIOR ART DOCUMENT

Patent Document

Patent Document 1: JP 2016-188693 A

SUMMARY OF THE INVENTION

Problems to be Solved by the Invention

In recent years, a low fuel consumption regulation for vehicles has become severe, and therefore installation onto vehicles, of a flow control valve device that adjusts a flow rate and a flow passage of cooling water from an internal combustion engine in order to achieve low fuel consumption by enhancing heat efficiency of a vehicle, has been promoted. In a ring-like seal used in the flow control valve device, a PTFE resin is used as described in Patent Document 1, however there is room for improving the durability and the cost of the seal. Further, a PTFE resin is high in melt viscosity and the injection molding cannot be adopted thereto. Consequently, it is necessary to apply machining to a molded body formed by means of compression molding or extrusion molding, and therefore the cost of the ring-like seal having a complex shape might be increased. Also, it has been required to improve the sealing performance for the cooling water and to reduce the friction resistance with the rotor served as a mating material.

An object of the present invention is, in order to solve such problems, to provide a flow control valve seal that is manufactured at a low cost, that makes wear damage of a rotor with which the flow control valve seal slidably contacts less, and that is superior in its low leak performance, low friction performance, and low wear performance, and also to provide a flow control valve device having the flow control valve seal.

Means for Solving the Problems

A flow control valve seal of the present invention (hereinafter, also referred to as merely a "seal") is installed in a flow control valve device including a housing having an introduction part that receives a cooling water from an internal combustion engine and a discharge part that discharges the cooling water, and a resin rotor disposed in the housing and having an outer peripheral surface formed in a spherical or cylindrical shape, the rotor being rotated relative to the housing. The flow control valve seal is disposed between the introduction part or the discharge part and the rotor in the housing. The flow control valve seal is formed in a ring-like shape that slidably contacts with the outer peripheral surface of the rotor. The flow control valve seal is an injection molded body of a resin composition having injection-moldable fluororesin as a base resin. The fluororesin is at least one resin selected from among a tetrafluoroethylene-perfluoro alkylvinyl ether copolymer (PFA) resin, a tetrafluoroethylene-hexafluoropropylene copolymer (FEP) resin, and a tetrafluoroethylene-ethylene copolymer (ETFE) resin.

The resin composition may contain a non-fibrous filler and may not contain a fibrous filler.

The non-fibrous filler may be graphite or PTFE resin, and the resin composition may contain 3-30 vol % of the filler to the whole of the resin composition and the residual part of the fluororesin.

The flow control valve seal may include a circumferential projection that is continuously formed along the whole circumference of the seal, on a ring-like sealing surface that slidably contacts with the rotor.

A flow control valve device of the present invention (hereinafter, also referred to as merely a "valve device") includes: a housing having an introduction part that receives a cooling water from an internal combustion engine and a discharge part that discharges the cooling water; a resin rotor disposed in the housing and having an outer peripheral surface formed in a spherical or cylindrical shape, the rotor being rotated relative to the housing; and a flow control valve seal disposed between the introduction part or the discharge part and the rotor in the housing, the flow control valve seal being formed in a ring-like shape that slidably contacts with the outer peripheral surface of the rotor. The flow control valve seal is an injection molded body of a resin composition having injection-moldable fluororesin as a base resin. The fluororesin is at least one resin selected from among a PFA resin, a FEP resin, and an ETFE resin. The rotor is an injection molded body of a resin composition having a polyphenylene sulfide (PPS) resin as a base resin.

Effect of the Invention

The flow control valve seal of the present invention is an injection molded body of a resin composition having a PFA resin, a FEP resin or an ETFE resin as a base resin, and thereby the seal having a complex shape can be formed only by injection molding at a low cost. Further, each of the PFA resin, the FEP resin, and the ETFE resin has low elasticity and low rigidity, and therefore the resin is easily deformed along the outer peripheral surface of a curved shape (spherical shape or cylindrical shape) of the resin rotor and the sealing therebetween is easily performed. Further, each of the PFA resin, the FEP resin, and the ETFE resin is superior in alkali resistance and low water absorption performance, and therefore the degradation of the resin can be suppressed under the environment of contacting with the cooling water. Consequently, the seal is manufactured at a low cost, the wear damage of the rotor with which the seal slidably contacts is less, and superior low leak performance, low friction performance, and low wear performance can be obtained.

The resin composition contains a non-fibrous filler and does not contain a fibrous filler, and thereby the wear damage is hardly on the resin rotor served as a mating material and a low friction and low wear property can be obtained.

The flow control valve seal includes the circumferential projection that is continuously formed along the whole circumference of the seal, on a ring-like sealing surface that slidably contacts with the rotor, and thereby a stable contact surface can be secured and a contact area between the rotor and the seal can be made small. Consequently, the friction force can be reduced.

In the flow control valve device of the present invention, the flow control valve seal is an injection molded body of a resin composition having the PFA resin, the ETFE resin, or the FEP resin as a base resin, and the rotor is an injection molded body of a resin composition having the PPS resin as abase resin. Accordingly, the seal and the rotor are slid to each other on the different resin materials. Thus, a wear increase due to a high friction coefficient that might be worried in the sliding between the same resin materials can be prevented and a low friction and low wear property can be obtained.

MODE FOR CARRYING OUT THE INVENTION

Figure 1:
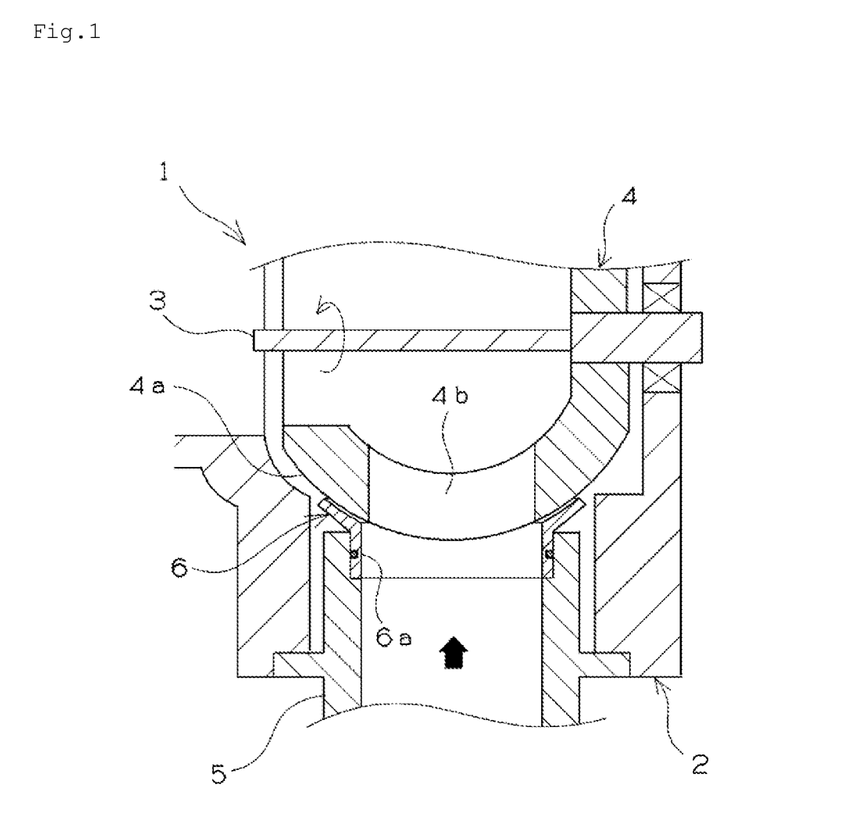
FIG. 1 is a cross-sectional view of a main part of a flow control valve device of the present invention, when a valve is opened.

One example of a valve device to which a flow control valve seal of the present invention is applied, will be described with reference to FIG. 1. As shown in FIG. 1, a valve device 1 is provided with a housing 2, a rotational shaft 3 that is supported rotatably relative to the housing 2, a rotor 4 that is housed in the housing 2 and rotated integrally with the rotational shaft 3, and a seal 6 that slidably contacts with an outer peripheral surface 4a of the rotor 4. In the housing 2, an introduction part 5 that receives cooling water from an engine, and a discharge part (not shown) that discharges the cooling water to respective devices such as a radiator are disposed. A fix seal such as an O-ring is disposed between the introduction part 5 or the discharge part and the seal 6. FIG. 1 is a cross-sectional view of a main part at a side of the introduction part in the valve device 1. The rotational shaft 3 is connected to a motor (not shown).

The rotor 4 is a spherical rotational rotor having a hollow part therein. The outer peripheral surface 4a of the rotor 4 that slidably contacts with the seal 6 is formed in a convex spherical shape. The rotor 4 has a rotor opening 4b that penetrates the rotor 4 from an inside to an outside thereof. The seal 6 has a seal opening that penetrates the seal 6 at a center part thereof. When the rotational shaft 3 is rotated in a direction of an arrow, the rotor 4 is rotated in association with the rotation of the rotational shaft 3. When the rotor opening 4b and the seal opening are communicated to each other by the rotation of the rotor 4, the valve is turned into an opened state. While, the communication between the rotor opening 4b and the seal opening is cancelled by the rotation of the rotor 4, the valve is turned into a closed state. In the opened state shown in FIG. 1, the cooling water that flows in a direction of a black arrow is introduced into the rotor 4. In this way, opening and closing of the valve of the valve device 1 are controlled by rotationally operating the rotor 4, and thereby the flow rate and the distribution of the cooling water are adjusted.

The rotor is formed of resin and is an injection molded body of a resin composition having a thermoplastic resin as a base resin. The thermoplastic resin is not especially limited, but a thermoplastic resin other than fluororesin is preferably used as the thermoplastic resin. For example, a PPS resin, a polyamide (PA) 66 resin, a modified PA resin, a polyether ether ketone (PEEK) resin or the like may be adopted. Of these resins, the PPS resin is preferable because of its superior low water absorption performance, heat resistance, and alkali resistance, and low cost.

It is preferable that glass fiber is compounded into the resin composition used for the rotor 4 in order to obtain high strength, high elasticity, and high dimensional accuracy. The PPS resin into which the glass fiber is compounded is more preferable because of its superior high strength and high elasticity. In a case in which the glass fiber is compounded, the compound amount thereof is 10-50 mass %, preferably 20-40 mass % to the whole resin composition. In a case in which the glass fiber is more than the predetermined amount, the wear damage is caused on the seal. In a case in which the glass fiber is less than the predetermined amount, enough strength is not obtained. Additives such as an inorganic material may be compounded into the resin composition in order to eliminate anisotropy and to improve the dimensional accuracy.

The seal 6 is disposed between the rotor 4 and the cylindrical introduction part 5 in the housing 2. Specifically, a cylindrical part 6a of the seal 6 is fitted in and fixed to a cylindrical end part at a side of the rotor 4 of the introduction part 5. The seal 6 is pressed against the rotor 4 and thereby deformed along a shape of the outer peripheral surface 4a of the rotor. With this adherence state, the leakage of the cooling water is prevented.

FIG. 1 shows the configuration at a side of the introduction part, however a configuration at a side of the discharge part is basically the same. Specifically, a seal is disposed between the rotor 4 and the cylindrical discharge part (not shown) in the housing 2. The seal is pressed against the rotor 4 to adhere to the outer peripheral surface 4a. The seal is formed in the same shape as the seal 6 and formed of the same material as the seal 6 in FIG. 1. The discharge part is disposed at a position in the housing 2, far away from the introduction part 5 by a predetermined distance in a circumferential direction of the rotor 4 to be rotated (for example, a position opposite to the introduction part 5 in FIG. 1).

Figure 2:
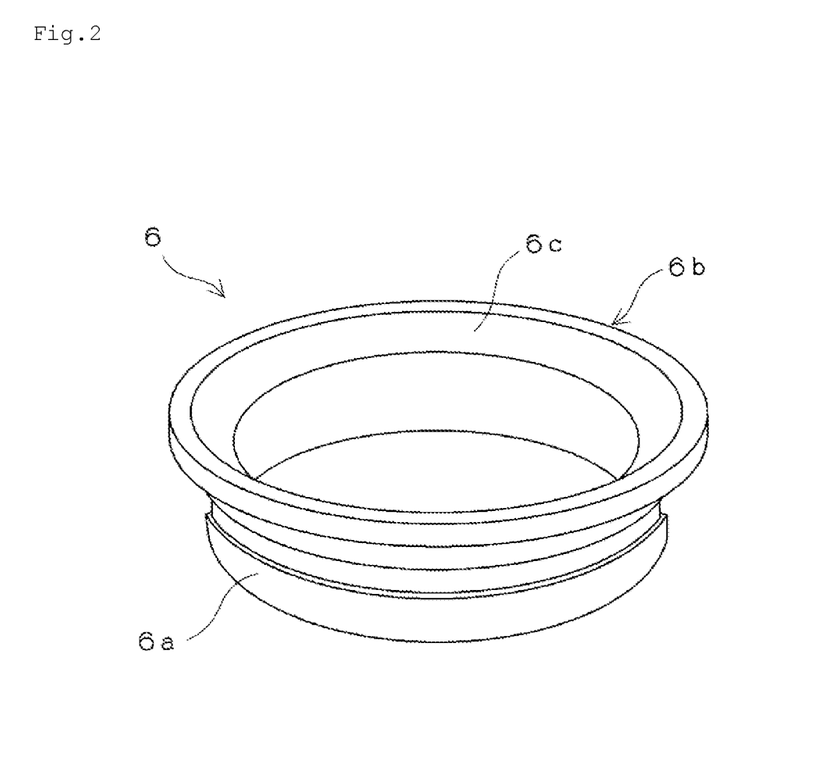
FIG. 2 illustrates one example of a flow control valve seal of the present invention.

The seal 6 served as a flow control valve seal of the present invention will be described with reference to FIG. 2. As shown in FIG. 2, the seal 6 is a ring-like member having an opening that penetrates the seal 6 at a center axis portion thereof. The seal 6 has the cylindrical part 6a to be fixed to the introduction part, at one side in an axial direction, and a lip part 6b at the other side in the axial direction. The lip part 6b has a structure in which a cylindrical body is expanded to an outer diametrical side such that an inner diameter size is increased. An inner peripheral surface of the lip part 6b is served as a sealing surface 6c that slidably contacts with the outer peripheral surface 4a of the rotor 4. The sealing surface 6c has a structure of a concave spherical shape that easily adheres to the spherical rotor 4. However, the sealing surface 6c may be formed in a flat surface. In FIG. 2, the sealing surface 6c is a smooth surface without a projection (protrusion) and a recess. A groove to which an O-ring is attached is formed on an outer periphery of the cylindrical part 6a of the seal 6 so as to seal between the introduction part 5 or the discharge part and the seal 6.

When the valve device 1 is operated to be opened or closed, the rotor 4 is rotated in a state in which the seal 6 is pressed against the rotor 4. The seal 6 is fixed, and therefore the sealing surface 6c always slidably contacts with the outer peripheral surface 4a of the rotor 4. Consequently, the wear of the seal 6 is liable to progress compared to the outer peripheral surface 4a of the rotor. Also, it is necessary that the seal 6 adheres to the curved shape of the rotor, and therefore an appropriate deformability is required to the seal 6. Further, an aqueous solution of PH 7-11 containing ethylene glycol as a main component (antifreeze solution) is generally used as the cooling water, and therefore the alkali resistance and the low water absorption performance are also required to the seal 6 that contacts with the cooling water.

The flow control valve seal of the present invention is an injection molded body of a resin composition having injection-moldable fluororesin as a base resin. The fluororesin is at least one resin selected from among a PFA resin, a FEP resin, and an ETFE resin. As the base resin, each of the PFA resin, the FEP resin, and the ETFE resin may be used independently, or alternatively a combination of two or more of them may be used. Since each of the PFA resin, the FEP resin, and the ETFE resin has low elasticity and low rigidity, the seal is easily deformed along the outer peripheral surface of the curved shape (spherical or cylindrical shape) of the resin rotor, and therefore the sealing performance can be improved. Further, since each of the PFA resin, the FEP resin, and the ETFE resin is superior in the alkali resistance and the low water absorption performance, the degradation of the resin can be suppressed under the environment of contacting with the cooling water.

In a case in which the resin rotor and the seal that slidably contacts with the resin rotor are formed of the same resin material, the friction coefficient is high, and therefore the wear of the rotor and the wear of the seal might be large. However, since the rotor is formed of non-fluororesin and the seal is formed of fluororesin selected from among the PFA resin, the FEP resin, and the ETFE resin, such a problem is not caused.

While, the PTFE resin generally adopted as the resin material for the flow control valve seal is large in wear amount in an abrasive wear mode. For example, in a case in which the rotor is formed of the PPS resin into which the glass fiber is compounded, the outer peripheral surface of the rotor is gradually worn due to the sliding contact with the seal, and thereby it is considered that the glass fiber is exposed on the surface of the rotor. Since the sliding contact with the rotor of which the glass fiber is exposed on the surface causes the abrasive wear mode, in a case in which the PTFE resin is used as the base resin of the seal, the wear might be much. Against this, the seal that adopts the PFA resin, the FEP resin, or the ETFE resin is superior in wear resistance against the abrasion wear compared to the PTFE resin. Further, the seal can be formed by means of injection molding, and thereby the complex shape can be manufactured at a low cost.

In order to facilitate the injection molding, it is preferable that the melt flow rate (MFR) of each of the PFA resin and the FEP resin is 10-50 g/10 minutes at a temperature of 372° C. and a load of 5 kg. Further, it is preferable that the MFR of the ETFE resin is 10-50 g/10 minutes at a temperature of 297° C. and a load of 5 kg. In a case in which the MFR is less than 10 g/10 minutes, a melting flowability is inferior, and therefore accuracy of the sealing surface is not obtained due to the insufficient filling in the injection molding. Further, in a case in which the MFR is more than 50 g/10 minutes, the molecular weight is less, and therefore the wear resistance is insufficient.

Also in the resin composition containing a filler, in a case in which the MFR is less than 10 g/10 minutes, a melting flowability is inferior, and therefore accuracy of the sealing surface is not obtained due to the insufficient filling in the injection molding. The upper limit of the MFR of the resin composition into which the filler is compounded is not especially limited, however it is preferable that the upper limit is equal to or less than 50 g/10 minutes in a viewpoint of the wear resistance.

As the base resin, the fluororesin of any one of the PFA resin, the FEP resin, and the ETFE resin can be adopted. Since the resin is liable to match along the outer peripheral surface of the rotor as the elastic modulus of the resin becomes lower and thereby the favorable sealing performance is obtained, it is preferable to adopt the PFA resin that has the bending elastic modulus (based on ASTM D790) of 1 GPa or less and is superior in its long-term heat resistance, friction property, and chemical resistance. Further, in order to decrease the elastic modulus of the resin composition, elastomer may be compounded into the PFA resin, the FEP resin, or the ETFE resin. Fluororubber is preferable as the elastomer. A kind of the fluororubber is not limited, and therefore a vinylidene fluoride fluororubber (FKM), a tetrafluoroethylene-propylene fluororubber (FEPM), or a tetrafluoroethylene-perfluorovinylether fluororubber (FFKM) may be adopted. FKM of bipolymer or terpolymer may be adopted.

In order to improve the friction wear property of the resin composition in the cooling water, it is preferable to compound a filler having a resistance against an alkali aqueous solution of PH 7-11, into the resin composition. Examples of the filler include carbon fiber, graphite, PTFE resin, inorganic material (mica, talc, calcium carbonate, or the like), and whisker (calcium carbonate, potassium titanate, or the like). Of these fillers, a non-fibrous filler is preferable, and in this case, the filler that does not contain a fibrous filler is more preferable. An effect of the non-fibrous filler that increases the elastic modulus of each resin (PFA resin, FEP resin, or ETFE resin) is smaller than the effect of the fibrous filler. Accordingly, the seal 6 can be deformed along the outer peripheral surface 4a of the rotor 4 while improving the friction wear property, and thereby the favorable sealing performance can be obtained. Further, there is also an advantage that the rotor 4 to be served as a mating material is hardly damaged.

The non-fibrous filler may be a filler other than the fibrous filler having an aspect ratio such as carbon fiber, glass fiber, and whisker. Examples of the non-fibrous filler include amorphous fillers such as a granular filler, a spherical filler, a scaly filler, and a plate-like filler. Of these fillers, the granular filler and the spherical filler having an isotropic property are preferable.

As the non-fibrous filler, it is preferable to adopt the graphite or the PTFE resin. The graphite derives an effect of low friction and low wear property in the cooling water. The scaly, granular, or spherical graphite may be adopted. It is more preferable to adopt the granular graphite or the spherical graphite that does not increase the elastic modulus of each of the PFA resin, the FEP resin, and the ETFE resin. The PTFE resin derives low friction coefficient in a boundary lubrication state in which the cooling water is not interposed between the sealing surfaces. An average particle diameter of the PTFE resin is not especially limited, however the average particle diameter is preferably set to 10-50 μm. The average particle diameter is measured by, for example, a particle diameter distribution measurement device using a laser scattering method. The seal formed of the resin composition in which the graphite or the PTFE resin is compounded into the base resin described above, hardly causes the wear damage on the resin rotor, and the sealing performance that is stable in a long term can be obtained. Further, since the seal is superior in the alkali resistance, the seal can be used in a long term without degradation.

A well-known resin additive may be compounded into the resin composition to such an extent that does not deteriorate an advantage of the present invention. Examples of the additive include a friction property improving agent such as boron nitride, molybdenum disulfide, and tungsten disulfide, and a coloring agent such as carbon powder, iron oxide, and titanium oxide.

The resin composition used in the seal of the present invention contains 70-100 vol % of the base resin described above to the whole resin composition. In a case in which the filler is compounded into the resin composition, it is preferable that the resin composition contains 3-30 vol % of the filler and the residual part of the base resin, and it is more preferable that the resin composition contains 5-20 vol % of the filler and the residual part of the base resin. As the filler, it is preferable to adopt the graphite or the PTFE resin, which is a non-fibrous filler, and it is more preferable to adopt a combination of the graphite and the PTFE resin.

The flow control valve seal of the present invention can be manufactured at a low cost by the injection molding using the resin composition described above. A gate type in the injection molding may adopt a one gate type in which one gate is disposed at an inner diametrical side or an outer diametrical side of the seal, or a multiple gates type in which a plurality of gates is disposed. In order to improve the accuracy of the sealing surface, it is preferable to adopt the multiple gates type in which three or more gates are disposed. Also, a disc gate type can be adopted to further improve the accuracy of the sealing surface. A gate mark caused by using the disc gate type can be removed by means of gate cutting in the mold, or machining after molding. It is the most preferable that the disc gate is disposed at the inner diametrical side of the seal because the gate mark can be machined and removed easily while chucking the outer diametrical side of the seal by a lathe. In order to further improve the sealing performance by improving the accuracy of the sealing surface, only the sealing surface may be finished by means of machining or the like after the injection molding is performed.

Figure 3:
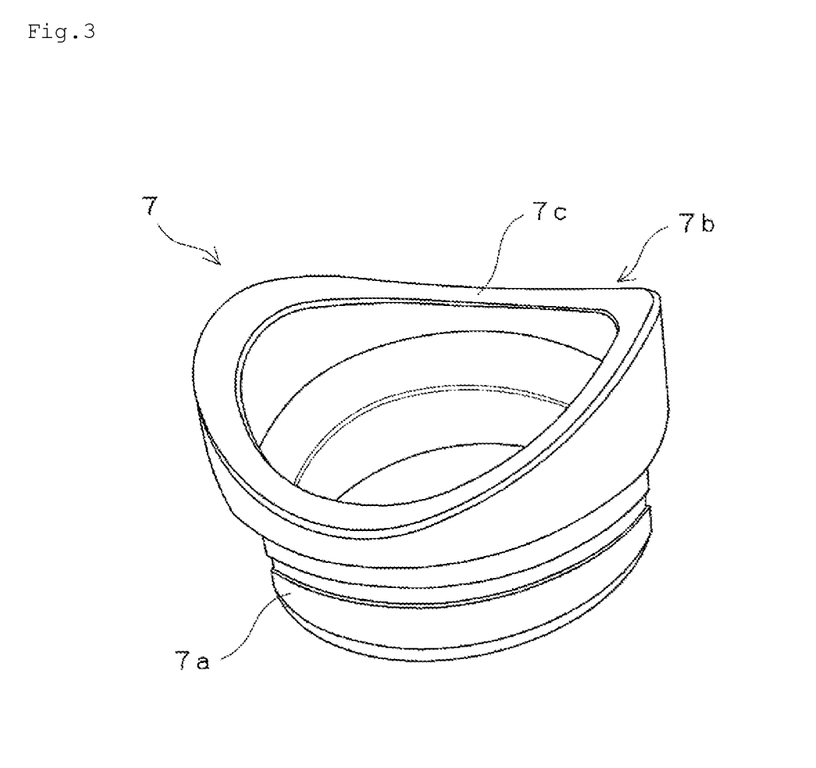
FIG. 3 illustrates another example of the flow control valve seal of the present invention.

FIG. 3 shows another example of the flow control valve seal of the present invention. As shown in FIG. 3, a seal 7 is a ring-like member having an opening that penetrates the seal 7 at a center axis portion thereof. The seal 7 has a cylindrical part 7a to be fixed to the introduction part, at one side in an axial direction, and a lip part 7b at the other side in the axial direction. Here, the seal 6 shown in FIG. 2 is formed to slidably contact with the spherical rotor, while the seal 7 shown in FIG. 3 is formed to slidably contact with a cylindrical rotor. Thus, in order to adhere to a convex cylindrical curved surface of the rotor, a sealing surface 7c is formed in a concave cylindrical curved surface that is matched with the cylindrical curved surface of the rotor. In other words, the sealing surface 7c is formed in a corrugated shape along the axial direction.

Figure 4:
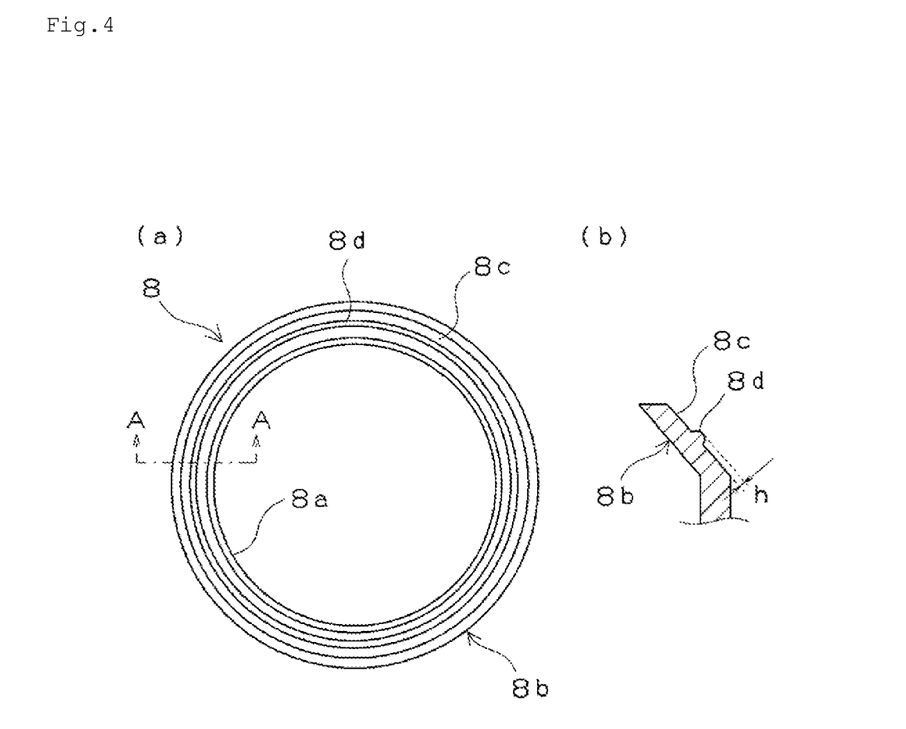
FIGS. 4(a) and 4(b) illustrate a shape of a projection of the flow control valve seal of the present invention.

FIGS. 4(a) and 4(b) show the other example of the flow control valve seal of the present invention. FIG. 4(a) is a plane view of the seal seen from a side of a lip part. FIG. 4(b) is a cross-sectional view of a part of the seal taken along line A-A. In a seal 8 shown in FIG. 4, a circumferential projection 8d is disposed on a ring-like sealing surface 8c. The circumferential projection 8d is continuously formed on the whole circumference of the seal at a center in a width direction of the sealing surface 8c. As shown in FIG. 4 (b), the circumferential projection 8d is formed in a convex shape on the sealing surface 8c. The convex shape is a round shape. A section of the circumferential projection 8d is an arc shape. The arc of the circumferential projection 8d has an angle of 180 degrees or less, preferably set to the arc angle that the circumferential projection 8d can be extracted from a mold in the injection molding without forcible extraction. It is preferable that the circumferential projection 8d is not protruded from a distal end surface of the lip part orthogonal to the axial direction of the seal 8.

The seal of the present invention is an injection molded body, and therefore fine (micro-level) unevenness is caused on the sealing surface formed by the injection molding. In a case in which the sealing is performed by the whole sealing surface, the unevenness on the sealing surface is lessened due to the sliding contact with the rotor and thereby the contact surface is made uniform. Consequently, the leakage amount is reduced. However, it is considered that making the contact surface uniform takes much time. Thus, the continuous circumferential projection is formed on the sealing surface so as to limit the sealing portion in the projection. Consequently, the accuracy of the sealing surface in the injection molding is easily improved, the sealing surface can be secured by deforming a tip of the projection due to a load, the contact surface is made uniform earlier in the sliding contact, and thereby the low leak performance can be obtained. Also, the contact area with the rotor is reduced, and thereby the friction force due to the sliding contact can be reduced. Further, by forming the convex shape in a round shape, the contact area with the rotor is further reduced. Consequently, the friction force can be further reduced, and the sealing performance is made stable because the whole circumference of the seal easily contacts with the rotor.

In the configuration shown in FIGS. 4(a) and 4(b), one circumferential projection is disposed on the sealing surface, however it is not limited to this, and therefore a plurality of the circumferential projections may be disposed on the sealing surface. Considering the accuracy of the sealing surface in the injection molding, and the friction force and the sealing performance of the sealing surface, it is preferable to dispose two circumferential projections. In this configuration, a first circumferential projection may be disposed continuously on the whole circumference at an inner diametrical side of the sealing surface, and a second circumferential projection, which is concentric to the first circumferential projection, may be disposed at the outer diametrical side of the sealing surface. A height of the first circumferential projection and a height of the second circumferential projection may be the same or different to each other. Further, a circumferential projection may be disposed on the sealing surface of the seal for the cylindrical rotor shown in FIG. 3.

EXAMPLES

Hereinafter, the present invention will be further specifically described with reference to examples. However, the present invention is not limited to the following examples. Table 2 and Table 4 show a configuration of the resin composition of each of Examples and Comparative examples, and the result of a wear test thereof.

Examples 1 to 3 and Comparative Examples 1 to 4

The bending test specimens and the wear test specimens (ring specimen) were formed by the injection molding using the resin composition compounded by the compound rate (vol %) shown in Table 2. In Comparative example 1 using the PTFE resin, each specimen was formed by compression forming.

A test based on ASTM D790 was performed on each of the obtained bending test specimens, and the bending elastic modulus (unit: GPa) thereof at 23° C. was measured.

Further, a wear test was performed on each of the obtained wear test specimens in a test condition shown in Table 1 using a ring on disk tester, and the wear amount of each of the ring specimen and the mating material was measured. LLC in Table 1 denotes an engine cooling water containing ethylene glycol as a main component.

Ring specimen: ϕ17 (inner diameter)×ϕ21 (outer diameter)×10 (width) mm

Mating material: ϕ33 (outer diameter)×6 (width) mm, Turning, surface roughness Ra 1 μm

TABLE 1

| Test condition | |
| --- | --- |
| Circumferential speed | 1.5 m/min |
| Surface pressure | 0.3 MPa |
| Lubrication | LLC (density 50%) |
| Temperature | Room temperature |
| Mating material | PPS resin with glass fiber 40 wt % |
| Time | 50 hours |

TABLE 2

| | Example 1 | Example 2 | Example 3 | Comparative example 1 | Comparative example 2 | Comparative example 3 | Comparative example 4 |
| --- | --- | --- | --- | --- | --- | --- | --- |
| Resin composition | PFA: 100 vol % | FEP: 100 vol % | ETFE : 100 vol % | PTFE : 100 vol % | PPS: 100 vol % | PA66: 100 vol % | PEEK: 100 vol % |
| Available/unavailable of injection molding | 10 Available | Available | Available | Unavailable | Available | Available | Available |
| Bending elastic modulus (GPa) [1] | 0.67 | 0.65 | 1.4 | 0.55 | 3.8 | 2.9 | 3.8 |
| Wear amount of specimen (μm) | 24 | — | 17 | 34 | 29 | — | — |
| Wear amount of mating material (μm) | <1 | — | <1 | <1 | 3 | — | — |

[1] Test method: ASTM D790

As shown in Table 2, the resin compositions of Examples 1 to 3 having a base resin of the PFA resin, the FEP resin, and the ETFE resin, respectively, are injection-moldable and are low in the bending elastic modulus compared to Comparative examples 2 to 4. In particular, in Examples 1 and 2 using the PFA resin and the FEP resin, each bending elastic modulus is 1 GPa or less, and therefore each resin composition is easily deformed along the curved surface of the rotor. While, although the PTFE resin (Comparative example 1) is low elasticity of which the bending elastic modulus is low, the PTFE resin is not injection-moldable. In the wear test, the wear of itself and the wear of the mating material of each of Example 1 (PFA resin) and Example 3 (ETFE resin) are small compared to each of Comparative example 1 (PTFE resin) and Comparative example 2 (PPS resin). In a case in which the PPS resin is used, the wear of the mating material is also caused.

Examples 4 to 9 and Comparative Example 5

The fillers used in Examples 4 to 9 and Comparative example 5 are collectively described below. Each of average particle diameters of GRP-1 to GRP-3, and PTFE-1 is a 50% particle diameter measured by a particle diameter distribution measurement device using a laser scattering method.
(1) Graphite (GRP-1)
   Nippon Graphite Industries, Co., Ltd.: CGB-20 (average particle diameter: 20 μm)
(2) Graphite (GRP-2)
   Nippon Graphite Industries, Co., Ltd.: CGB-50 (average particle diameter: 50 μm)
(3) Graphite (GRP-3)
   Imerys Graphite & Carbon Japan Ltd.: TIMREX KS-25 (average particle diameter: 10 μm)
(4) PTFE resin powder (PTFE-1)
   Average particle diameter: 20 μm
(5) Carbon fiber (CF-1)
   Kureha Corporation: M-107T (fiber diameter 18 μm, average fiber length 0.4 mm)

The wear test specimens (ring specimen) were formed by the injection molding using the resin composition compounded by the compound rate (vol %) shown in Table 4. In Comparative example 5 using the PTFE resin, the specimen was formed by the compression forming.

A wear test was performed on each of the obtained wear test specimens in a test condition shown in Table 3 using a ring on disk tester. The wear amount of the ring specimen was measured and further presence/absence of the damage of the mating material after the test was visibly checked. LLC in Table 3 denotes an engine cooling water containing ethylene glycol as a main component.

Ring specimen: φ17 (inner diameter)×φ21 (outer diameter)×10 (width) mm

Mating material: φ33 (outer diameter)×6 (width) mm, Turning, surface roughness Ra 3 μm

TABLE 3

| Test condition | |
|---|---|
| Circumferential speed | 4.6 m/min |
| Surface pressure | 0.24 MPa |
| Lubrication | LLC (density 50%) |
| Temperature | 80° C. |
| Mating material | PPS resin with glass fiber 40 wt % |
| Time | 50 hours |

TABLE 4

| | Example 4 | Example 5 | Example 6 | Example 7 | Example 8 | Example 9 | Comparative example 5 |
|---|---|---|---|---|---|---|---|
| Resin composition (vol %) | | | | | | | |
| Base resin | | | | | | | |
| PFA resin | 85 | 85 | 85 | 80 | 85 | — | — |
| ETFE resin | — | — | — | — | — | 80 | — |
| PTFE resin | — | — | — | — | — | — | 90 |
| Filler | | | | | | | |
| GPR-1 | 10 | — | — | — | — | — | — |
| GPR-2 | — | 10 | — | 20 | — | 20 | — |
| GPR-3 | — | — | 10 | — | — | — | 10 |
| PTFE-1 | 5 | 5 | 5 | — | 5 | — | — |
| CF-1 | — | — | — | — | 10 | — | — |
| Available/unavailable of injection molding | Available | Available | Available | Available | Available | Available | Unavailable |
| Wear amount of specimen (μm) | 17 | 18 | 22 | 11 | 30 | 15 | 40 |
| Presence/absence of damage of mating material | None | None | None | None | Damaged | None | None |

As shown in Table 4, the resin compositions of Examples 4 to 8 having a base resin of the PFA resin and Examples 9 having a base resin of the ETFE resin are injection-moldable, and the ware amount of the specimens are 11-30 μm. The wear amount of each of Examples 4 to 7 in which the graphite is compounded is small compared to Example 8 in which the carbon fiber is compounded. Further, in Example 8, the mating material is damaged.

In the resin composition of Comparative example 5, the graphite is compounded into the PTFE resin as the base resin. The wear amount of the specimen of Comparative example 5 is 40 μm, which is inferior to the wear resistance of each of Examples 4 to 9.

INDUSTRIAL APPLICABILITY

The flow control valve seal of the present invention can be manufactured at a low cost, and makes the wear damage of the rotor with which the flow control valve seal slidably contacts less, and is superior in its low leak performance, low friction performance, and low wear performance. Consequently, the flow control valve seal can be widely used in the flow control valve device that controls the flow rate of the cooling water.

REFERENCE SIGNS LIST

1: valve device
2: housing
3: rotational shaft
4: rotor
5: introduction part
6: seal
7: seal
8: seal

The invention claimed is:

1. A flow control valve seal that is installed in a flow control valve device comprising a housing having an introduction part that receives a cooling water from an internal combustion engine and a discharge part that discharges the cooling water, and a resin rotor disposed in the housing and having an outer peripheral surface formed in a spherical or cylindrical shape, the resin rotor being rotated relative to the housing, wherein:
   the flow control valve seal is disposed between the introduction part or the discharge part and the resin rotor in the housing;
   the flow control valve seal is formed in a ring-like shape that slidably contacts with the outer peripheral surface of the resin rotor;
   the cooling water is antifreeze solution;
   the flow control valve seal is an injection molded body of a resin composition having injection-moldable fluororesin as a base resin;

the fluororesin is at least one resin selected from among a tetrafluoroethylene-perfluoro alkylvinyl ether copolymer resin, a tetrafluoroethylene-hexafluoropropylene copolymer resin, and a tetrafluoroethylene-ethylene copolymer resin; and the resin composition does not contain a fibrous filler.

2. The flow control valve seal according to claim 1, wherein the resin composition contains a non-fibrous filler.

3. The flow control valve seal according to claim 1, wherein the non-fibrous filler is graphite or PTFE resin, and
the resin composition contains 3-30 vol % of the non-fibrous filler to a whole of the resin composition and a residual part of the fluororesin.

4. The flow control valve seal according to claim 1, further comprising a circumferential projection that is continuously formed along a whole circumference of the seal, on a ring-like sealing surface that slidably contacts with the resin rotor.

5. A flow control valve device comprising:
a housing having an introduction part that receives a cooling water from an internal combustion engine and a discharge part that discharges the cooling water;
a resin rotor disposed in the housing and having an outer peripheral surface formed in a spherical or cylindrical shape, the resin rotor being rotated relative to the housing; and
a flow control valve seal disposed between the introduction part or the discharge part and the resin rotor in the housing, the flow control valve seal being formed in a ring-like shape that slidably contacts with the outer peripheral surface of the resin rotor,
wherein:
the cooling water is antifreeze solution;
the flow control valve seal is an injection molded body of a resin composition having injection-moldable fluororesin as a base resin;
the fluororesin is at least one resin selected from among a tetrafluoroethylene-perfluoro alkylvinyl ether copolymer resin, a tetrafluoroethylene-hexafluoropropylene copolymer resin, and a tetrafluoroethylene-ethylene copolymer resin; the resin composition does not contain a fibrous filler; and
the resin rotor is an injection molded body of a resin composition having a polyphenylene sulfide resin as a base resin.

* * * * *